(12) United States Patent
Erich et al.

(10) Patent No.: US 7,835,402 B2
(45) Date of Patent: Nov. 16, 2010

(54) SYNCHRONIZATION MODULE

(75) Inventors: Armin Erich, Seefeld (DE); Stephan Schüler, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 76 days.

(21) Appl. No.: 11/792,630

(22) PCT Filed: Nov. 24, 2005

(86) PCT No.: PCT/EP2005/056193

§ 371 (c)(1),
(2), (4) Date: Dec. 3, 2009

(87) PCT Pub. No.: WO2006/063922

PCT Pub. Date: Jun. 22, 2006

(65) Prior Publication Data

US 2008/0117938 A1 May 22, 2008

(30) Foreign Application Priority Data

Dec. 16, 2004 (DE) ........................ 10 2004 061 127

(51) Int. Cl.
*H04J 3/06* (2006.01)
(52) U.S. Cl. ........................ 370/503; 370/509
(58) Field of Classification Search ................ 370/498, 370/503, 507–514, 464; 455/502; 709/248
See application file for complete search history.

(56) References Cited

U.S. PATENT DOCUMENTS

| | | | |
|---|---|---|---|
| 7,356,036 B2 * | 4/2008 | Van Der Valk et al. | 370/395.62 |
| 7,379,480 B2 * | 5/2008 | Balasubramanian et al. | 370/516 |
| 7,397,823 B2 * | 7/2008 | Engel | 370/503 |
| 7,535,931 B1 * | 5/2009 | Zampetti et al. | 370/508 |
| 7,561,598 B2 * | 7/2009 | Stratton et al. | 370/507 |
| 7,590,151 B2 * | 9/2009 | Middleton et al. | 370/516 |
| 2004/0233905 A1 * | 11/2004 | Weber | 370/389 |
| 2006/0059270 A1 * | 3/2006 | Pleasant et al. | 709/237 |
| 2006/0109376 A1 * | 5/2006 | Chaffee et al. | 348/423.1 |
| 2006/0153245 A1 * | 7/2006 | Schultze | 370/503 |

OTHER PUBLICATIONS

IEC 61588; "IEEE 1588" Precision clock synchronization protocol for networked measurement and control systems. Sep. 2004; pp. 1-156; IEEE; International Standard ISBN 2-8318-7541-2; XP002367391.

(Continued)

*Primary Examiner*—Chi H Pham
*Assistant Examiner*—Robert Lopata

(57) ABSTRACT

A synchronization module for providing synchronization messages to be sent with a time stamp in accordance with the PTP protocol of standard IEEE 1588 is provided. The synchronization module comprises a program module for generating a synchronization message to be sent and for providing the synchronization message with a first time stamp, and a hardware-implemented time stamp module which receives synchronization messages from the program module and forwards them in accordance with the PTP protocol. The time stamp module comprises a real time clock, a message detector for recognizing a synchronization message by its difference in relation to other messages and a message manipulator for overwriting the first time stamp in a synchronization message recognized by the message detector with a second time stamp actually retrieved from the real time clock.

12 Claims, 2 Drawing Sheets

OTHER PUBLICATIONS

Gramann T. et al.; "Precision Time Protocol IEEE 1588". In Praxis Zeitsynchronisation im Submikrosekundenbereich. WEKA Fachzeitschriftenverlag Poing, Nov. 25, 2003; pp. 86-93; vol. 52, No. 24; Germany.

Butner S. E. et al.; "Nanosecond-scale even synchronization over local-area networks", Local Computer Networks 2002; 27th Annual IEEE Conference on Nov. 6-8, 2002, Nov. 6, 2002; pp. 261-269; XP010628175.

Kannisto J. et al.; "Precision Time Protocol Prototype on Wireless LAN"; 11th International Conference on Telecommunications Proceedings; Aug. 1-6, 2004; pp. 1236-1245; XP0190009251; ISBN 3-540-22571-4; Brazil.

IEEE Standards; 588TM; "IEEE Standard for a Precision Clock Synchronization Protocol for Networked Measurement and Control Systems"; Nov. 8, 2002; Sponsored by the TC9-Technical Committee on Sensor Technology; pp. 1-144; The Institute of Electrical and Electronics Engineers, Inc., New York, NY, US.

* cited by examiner

SYNCHRONIZATION MODULE

CROSS REFERENCE TO RELATED APPLICATIONS

This application is the US National Stage of International Application No. PCT/EP2005/056193 filed Nov. 24, 2005 and claims the benefit thereof. The International Application claims the benefits of German application No. 102004061127.0 DE filed Dec. 16, 2004, both of the applications are incorporated by reference herein in their entirety.

FIELD OF INVENTION

The present invention relates to a synchronization module.

Stringent requirements are placed on the time synchronicity of components employed in distributed communication or data-processing systems. The clock generators of said components are frequently synchronized with each other via an asynchronous network through an exchange of data packets provided with time stamps, or with a reference clock generator accessible via the asynchronous network.

BACKGROUND OF THE INVENTION

What is termed the PTP protocol (PTP: Precision Time Protocol), which is defined in the IEEE 1588 standard (IEEE: Institute of Electrical and Electronic Engineers), is the protocol currently favored for synchronizing the clock and phase of clock generators via asynchronous networks. The cited standard basically makes a very high synchronizing accuracy possible. However, the hardware requirements for achieving said synchronizing accuracy are not precisely specified in the present version of said standard, namely "IEEE Std 1588™-2002, IEEE Standard for a Precision Clock Synchronization Protocol for Networked Measurement and Control Systems", dated Nov. 8, 2002.

The references made below to said standard relate to the aforementioned version, whose disclosure content is deemed to be included in the present document on a reference-specific basis.

The achievable synchronizing accuracy has hitherto been limited owing in particular to what is termed a software jitter occurring while the time stamps are being provided and read by an IEEE 1588 protocol stack implemented by software means. Said jitter is due mainly to the unsteady processing sequence of the responsible protocol routines, which are generally disrupted by the operating system by numerous what are termed interrupts. Said software jitter is within the scope of the IEEE 1588 standard referred to also as protocol stack delay fluctuation. A synchronizing accuracy only in the order of 1 μs to 100 μs has in practice proved to be attainable in this manner.

SUMMARY OF INVENTION

While it is true that higher synchronizing accuracies can basically be achieved using a PTP protocol implemented by hardware means, said kind of hardware implementation also increases the costs several times.

An object of the present invention is to disclose a synchronization module that exhibits an implementation of the PTP protocol according to IEEE 1588 standard and by means of which higher synchronizing accuracies can be attained at relatively little cost.

Said object is achieved by means of a synchronization module exhibiting the features of the independent claim.

Advantageous embodiments and developments of the invention are disclosed in the dependent claims.

BRIEF DESCRIPTION OF THE DRAWINGS

An exemplary embodiment of the invention is explained in more detail below with the aid of the in each case schematic drawings.

DETAILED DESCRIPTION OF INVENTION

Figure 1:
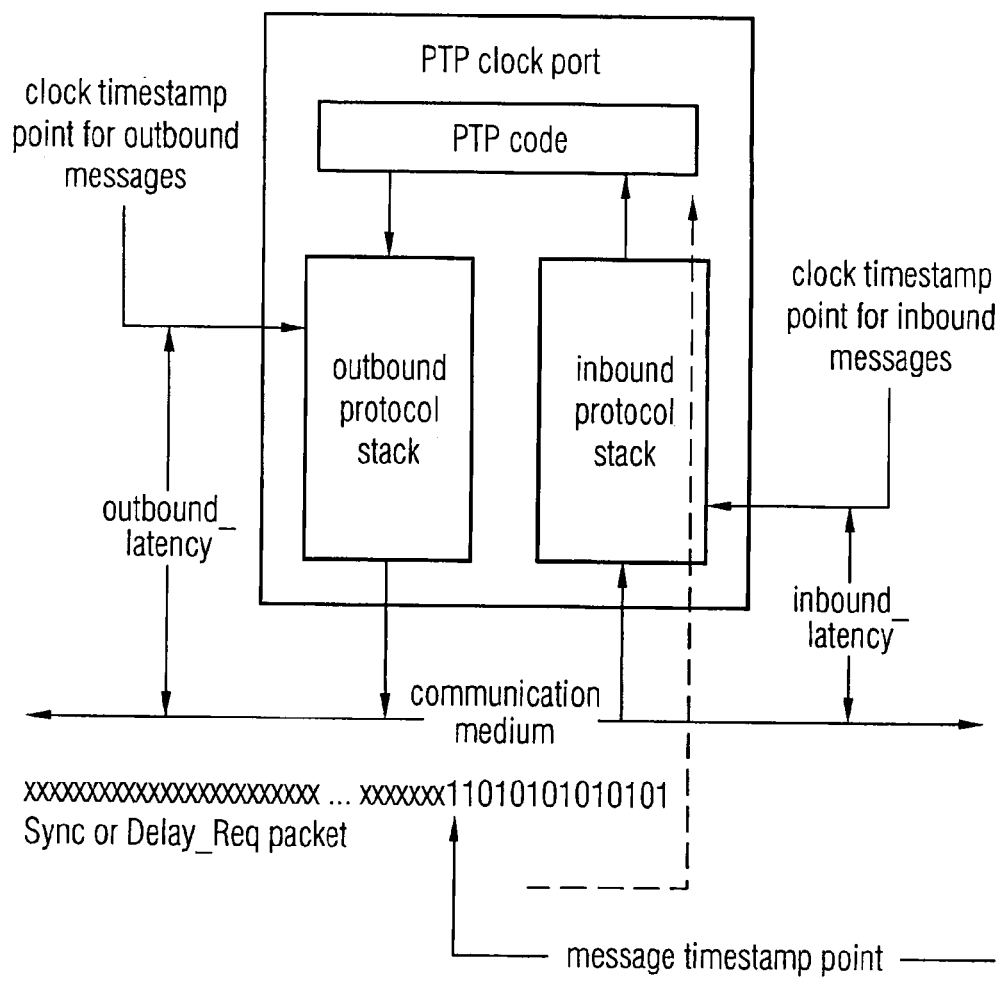
FIG. 1 is a chart illustrating different timestamp points and their latencies.

FIG. 1 is a chart from Section 6.2.4 of the known IEEE 1588™ 2002 standard document illustrating different timestamp points and their latencies. A message timestamp point illustrated there is an identifying feature of synchronization messages such as the PTP protocol's Sync and Delay_Req messages shown in FIG. 1. The message timestamp point can be identified if the relevant message passes through the clock timestamp point according to the PTP protocol. FIG. 1 shows a typical Sync or Delay_Req message that traverses the PTP protocol stack for inbound data packets along the arrowed dashed line. The message timestamp point represented in FIG. 1 by the first "11" bit pattern of the message after a series of leading "10" bit patterns passes through the clock timestamp point after an inbound_latency period after exiting the physical transmission medium. The above explanations are analogously applicable also to the timestamps and latencies of outbound synchronization messages.

Figure 2:
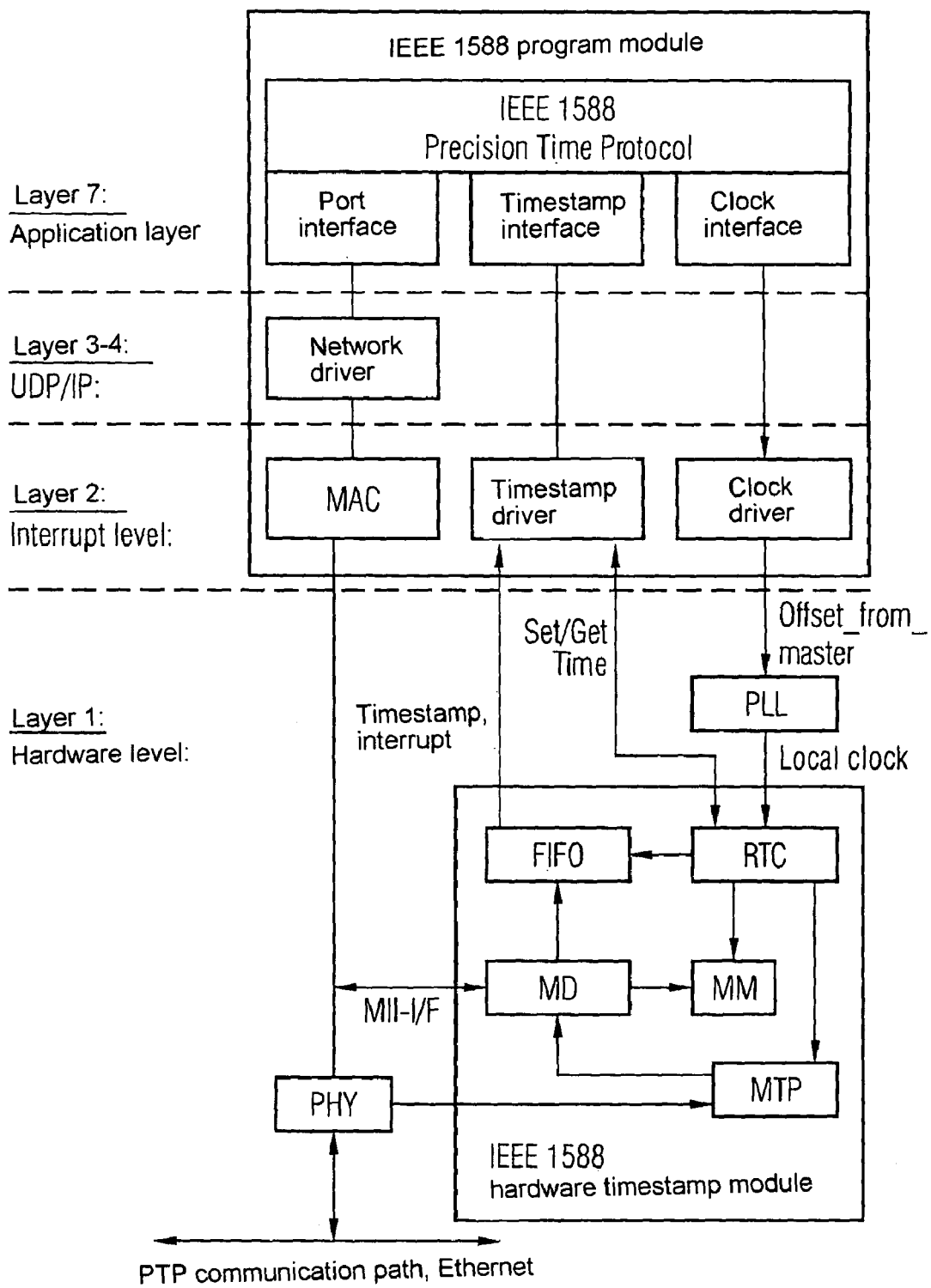
FIG. 2 shows an inventive synchronization module.

FIG. 2 is a schematic of an inventive synchronization module. A time-critical portion of the IEEE 1588 standard, namely the timestamp function, is in the case of said synchronization module inventively implemented by means of a specific hardware timestamp module and not by software means. The hardware timestamp module is implemented as an autonomous component and has defined interfaces. By contrast, the IEEE 1588 standard's functionality residing on layers 2-7 of the OSI reference model is implemented using a standard-compliant program module which in particular generates synchronization messages requiring to be sent and provides them with time stamps subsequently to be overwritten by the hardware timestamp module.

The hardware timestamp module has the following function blocks:

Realtime Clock RTC:

A 32-bit counter having the counting variables "seconds" and "nanoseconds" in keeping with the PTP protocol's OriginTimestamp fields and hence of the PTP protocol's TimeRepresentation type.

Message Detector MD (for Synchronization Messages Requiring to be Sent and Received):

The message detector MD serves to recognize the PTP protocol's PTP_SYNC_MESSAGE and PTP_DELAY_REQ_MESSAGE synchronization-message identifiers and can store certain fields of recognized synchronization messages in the buffer FIFO.

The PTP_SYNC_MESSAGE and PTP_DELAY_REQ_MESSAGE message identifiers are recognized as follows:

1. Recognizing and taking account of what are termed tags in the case of tagged frames
2. Recognizing a PTP_SYNC_MESSAGE and PTP_DELAY_REQ_MESSAGE by comparing the bit pattern of the serial bit stream with specific fields of Ethernet frames (for example UDP port 319 as what is termed the event port for PTP messages and the "control" field)
3. Reading the PTP fields: "control" and "sequenceId"
4. Storing said fields in the buffer FIFO
5. Storing the RTC timestamp registered at the "message timestamp point" instant.

Buffer FIFO (FirstInFirstOut Memory):

Example of its Contents:

| Control (8 bits) | SequenceId (16 bits) | Timestamp from RTC (2 * 32 bits) |
|---|---|---|
| 0 (PTP_SYNC_MESSAGE) | 100 | 0x12345678, 0x12345678 |
| 1 (PTP_DELAY_REQ_MESSAGE) | 101 | 0x12345678, 0x12345678 |

Message Manipulator MM:

The message manipulator MM can change values of certain fields of the synchronization messages recognized by the message detector MD.

The message manipulator MM can in the case of synchronization messages requiring to be sent overwrite the synchronization messages' OriginTimestamp timestamp fields in each case with the current time value of the realtime clock RTC that was valid at the "message timestamp point" instant according to FIG. 1. The message manipulator MM then calculates the "UDP checksum" fields and the Ethernet CRC field and also overwrites said fields of the respective synchronization message. The timestamp field and checksum fields are overwritten on the fly, meaning with very little additional delay. By contrast, both a considerable delay and an irregular and hence scarcely compensatable jitter would occur were the timestamp function to be implemented by software means.

The IEEE 1588 2002 standard can for synchronization messages requiring to be received be optionally extended to provide additional "ReceiveTimestamp" fields for the SyncMessage and DelayRequestMessage messages. What is termed an "Extension Mechanism" for adding new fields or, as the case may be, messages is currently scheduled. The additionally provided ReceiveTimestamp field can in the case of received synchronization messages be written by the message manipulator MM with the current time value of the realtime clock RTC that was valid at the "message timestamp point" instant according to FIG. 1. The message manipulator MM then calculates the "UDP checksum" fields and the Ethernet CRC field and also overwrites said fields of the received synchronization message. That is done on the fly, meaning with very little additional delay.

The very slight delays and their broad constancy are in the case of the inventive synchronization module made possible in particular by the fact that the message detector MD and message manipulator MM have direct (hardware) access to the realtime clock RTC.

Message Timestamp Point Store MTP:

The message timestamp point store MTP stores a timestamp at the instant at which the physical interface's interface component PHY has recognized the preamble to a synchronization message. To initiate storing of the timestamp, the interface module PHY sends a signal to the message timestamp point store MTP or, as the case may be, hardware timestamp module. As soon as the message detector MD has likewise recognized the synchronization message it can use the instant at which said signal was sent and which was stored in the message timestamp point store MTP as the exact timestamp.

A jitter that would otherwise be caused by the interface module PHY can be largely avoided thanks to this arrangement.

Phase-Locked Loop PLL:

The realtime clock RTC is clocked by the "local clock" clock signal. That can be supplied from an external phase-locked loop PLL. The phase-locked loop PLL can optionally also be integrated as a function block.

The realtime clock RTC is coarsely adjusted by directly setting an initial value from the PTP protocol stack. The realtime clock RTC is finely adjusted by regulating the phase-locked loop PLL.

The procedure in the synchronization module is as follows for a PTP synchronization message requiring to be sent by the inventive synchronization module:

The synchronization message requiring to be sent is generated by the IEEE 1588 program module in the PTP protocol stack and passed on to the MAC layer (MAC: Media Access Control) via layers 4 and 3 (UDP/IP). The timestamp fields are entered by the IEEE 1588 program module as provided in the present IEEE 1588 2002 standard. When forwarded from the MAC layer to the interface module PHY via an MII interface (MII: Media Independent Interface), the synchronization message is decoded by the hardware timestamp module. If, when that is done, a Sync or DelayRequest message is recognized by the message detector MD, then the timestamp fields that were replaced by the IEEE 1588 program module will be replaced by the message manipulator MM with the current, highly accurate time value of the realtime clock RTC. The "UDP checksum" checksum and the Ethernet CRC field will additionally be updated.

The clock timestamp point shown in FIG. 1 is generated by the hardware timestamp module directly at the message timestamp point. The inbound_latency and outbound_latency delays and the protocol stack delay fluctuation can thereby be reduced to a very small value.

The "local clock" clock signal's clock and phase accuracy is substantially improved in terms of jitter and maximum time deviation from the reference time source (clock master) for both what are termed "ordinary clocks" and what are termed "boundary clocks".

Typical values for the protocol stack delay fluctuation depending on how the clock timestamp point is implemented are listed below:

| Clock timestamp point: | Protocol stack delay fluctuation: |
|---|---|
| Software timestamp on layer 7 | 100 µs . . . 10 ms |
| Software timestamp on layer 2 | 1 µs . . . 100 µs |
| Hardware timestamp according to the invention | In the ns range |

Thanks to the synchronizing accuracies down to the nanosecond range that can be achieved, the way is paved for numerous new application fields for the IEEE 1588 standard.

A further advantage of the invention is to be seen in the protocol stack delay fluctuations being rendered largely independent of software influences. Said influences are due to, for instance, high or fluctuating processor-capacity utilization, interrupt blocking times, a high or fluctuating interrupt frequency, changing processor performance and/or the architecture of the interrupt controller.

It is also particularly advantageous that the protocol stack delay fluctuations are rendered largely independent of the hardware platform on which the PTP protocol is running (processor, hardware architecture). In contrast thereto, the protocol stack delay fluctuation changes considerably when a synchronization module according to IEEE 1588 2002, where the timestamp module is implemented by software means (layer 7 or 2), is ported to another hardware platform.

Very high synchronizing accuracies can be achieved at relatively little additional cost thanks to the functions being advantageously divided between the hardware and software, which is to say between the hardware timestamp module and IEEE 1588 program module.

The synchronizing accuracy can, though, be even further increased if the interface module PHY is clocked using the same "local clock" clock signal as the hardware timestamp module instead of by means of a separate clock generator. An inherent synchronicity between the interface module PHY and hardware timestamp module can be produced thereby.

Inventive synchronization modules can be employed both on a standalone basis as an ASIC (Application Specific Integrated Circuit), FPGA (Field Programmable Gate Array), or CPLD (Complex Programmable Logic Device), and in an embedded manner as a constituent of components of the physical layer (if the register I/F is used, for example MDI) or as a constituent of network processors.

The invention claimed is:

1. A synchronization module for providing synchronization messages required to be sent with a timestamp according to the Precision Time Protocol of the IEEE 1588 standard, comprising:
    a program module that generates a synchronization message to be sent and provides the synchronization message with a first timestamp according to the Precision Time Protocol; and
    a hardware timestamp module that accepts synchronization messages from the program module and sends synchronization messages according to the Precision Time Protocol, comprising:
    a realtime clock,
    a message detector that recognizes a synchronization message,
    a message timestamp point store configured to store a second timestamp called up from the realtime clock for a recognized synchronization message, the second timestamp being stored when the message timestamp point store receives a corresponding trigger signal from a module of a physical interface that is generated when a preamble of the synchronization message is recognized; and
    a message manipulator that overwrites the first timestamp in the recognized synchronization message with the second timestamp.

2. The synchronization module as claimed in claim 1, wherein the message detector and message manipulator are coupled directly to the realtime clock.

3. The synchronization module as claimed in claim 1, further comprising a buffer coupled to the message detector that buffers synchronizing information.

4. The synchronization module as claimed in claim 1, wherein the message manipulator enters a receive timestamp from the realtime clock into an additional field of a received synchronization message.

5. The synchronization module as claimed in claim 1, wherein the message manipulator determines a current checksum for the synchronization message provided with the second timestamp and overwrites the checksum with a new checksum.

6. The synchronization module as claimed in claim 5, wherein the message detector and message manipulator are coupled directly to the realtime clock.

7. The synchronization module as claimed in claim 6, further comprising a buffer coupled to the message detector that buffers synchronizing information.

8. The synchronization module as claimed in claim 7, wherein the message manipulator is also configured to enter a receive timestamp from the realtime clock into an additional field of a received synchronization message.

9. The synchronization module of claim 1 wherein the message detector and message manipulator have direct hardware access to the realtime clock and wherein the second timestamp being stored when the message timestamp point store receives a corresponding trigger signal from the module of a physical interface that is generated when the preamble of the synchronization message is recognized such that a jitter caused by the module of the physical interface is at least partially avoidable.

10. The synchronization module of claim 1 further comprising a phase-locked loop connected to the realtime clock, the realtime clock being adjustable by regulating the phase-locked loop.

11. The synchronization module of claim 1 wherein the physical interface is clocked using a clock signal that is also used for the hardware timestamp module.

12. The synchronization module of claim 1 wherein the synchronization module is employed as an Application Specific Integrated Circuit, a Field Programmable Gate Array, or a Complex Programmable Logic Device.

* * * * *